United States Patent [19]
Chang et al.

[11] Patent Number: 5,587,847
[45] Date of Patent: Dec. 24, 1996

[54] LASER PROTECTION WINDOW USING HOLOGRAPHIC OPTICAL ELEMENT AND CHANNEL PLATES

[75] Inventors: Byung J. Chang, Ann Arbor; James M. Tedesco, Livonia, both of Mich.

[73] Assignee: Kaiser Optical Systems, Ann Arbor, Mich.

[21] Appl. No.: 578,511

[22] Filed: Aug. 14, 1990

Related U.S. Application Data

[63] Continuation of Ser. No. 163,555, Mar. 3, 1988, abandoned.

[51] Int. Cl.$^6$ ............................. G02B 5/22; B32B 3/10
[52] U.S. Cl. ........................... 359/890; 359/11; 359/887
[58] Field of Search ............................... 359/11, 15, 227, 359/887, 890

[56] References Cited

U.S. PATENT DOCUMENTS

| | | | |
|---|---|---|---|
| 3,648,056 | 3/1972 | Brittewiler et al. | 250/239 |
| 4,586,780 | 5/1986 | Chern et al. | 350/3.7 |
| 4,586,781 | 5/1986 | Gunther et al. | 350/3.7 |
| 4,601,533 | 7/1986 | Moss | 350/3.7 |
| 4,788,094 | 11/1988 | Morita | 350/392 |
| 4,830,441 | 5/1989 | Chang | 350/3.7 |

FOREIGN PATENT DOCUMENTS

| | | | |
|---|---|---|---|
| 0021025 | 1/1935 | Australia | 350/276 |

*Primary Examiner*—Nelson Moskowitz
*Attorney, Agent, or Firm*—Gifford, Krass, Groh, Sprinkle, Patmore, Anderson & Citkowski, P.C.

[57] ABSTRACT

The present invention is a laser protection window for protection from uncontrolled laser illumination. This laser protection window includes a holographic optical element forming a reflection hologram at the wavelength of the expected laser threat. A set of channel plates opaque to the expected laser threat wavelength are disposed at right angles to the holographic optical element in order to block laser illumination arriving outside the cone of protection of the holographic optical element. These channel plates may be vertically disposed to provide protection against mostly horizontally disposed laser threats. In alternative embodiments, the channel plates include both horizontally and vertically disposed plates or plates disposed in polygonal cross section to cover the entire area of the laser protection window. The ratio of the height to the regular distance between channel plates is selected to block incoming radiation having an angle of incidence outside the cone of protection provided by the holographic optical element. The channel plates may be opaque to all light or be formed of holographic optical elements opaque to the wavelength of the expected laser threat.

30 Claims, 4 Drawing Sheets

LASER PROTECTION WINDOW USING HOLOGRAPHIC OPTICAL ELEMENT AND CHANNEL PLATES

This is a continuation of application Ser. No. 07/163,555 filed on Mar. 3, 1988, now abandoned.

TECHNICAL FIELD OF THE INVENTION

The technical field of the present invention is that of laser protection and in particular laser protection in the form of a window.

BACKGROUND OF THE INVENTION

Due to recent advances in the technology of laser generation and detection, laser systems for use in battlefield conditions have become more and more prevalent. These laser systems are employed for target illumination and tracking or for ranging. Such laser systems may also be employed for intentional blinding of personnel or sensors. In a particular battlefield setting, there may be numerous laser illuminators operating simultaneously. These laser illuminators may be both from friendly forces and from enemy forces. In particular, combat troops operating in this environment will be subject to uncontrolled illumination by laser radiation. Because of the great radiated power from these laser radiation sources, these personnel require some eye protection from this laser illumination.

There have heretofore been suggested numerous solutions for this problem of laser protection. In particular, in recent years there has been a rise in the use of holographic optical elements as laser protection devices. Holographic optical elements include 3-dimensional interference fringe patterns which diffract light at specified wavelengths. Holographic optical elements are ordinarily constructed employing laser illumination to form the interference fringes within the volume of a photosensitive medium. Upon development of the photosensitive medium, the pattern of the interference fringes is formed within this medium in the form of varying indices of refraction. When light of certain wavelengths enters such a holographic optical element, it is diffracted by the interference pattern therein.

In the case of laser protection eye wear, it is common to form a reflection holographic optical element which reflects incoming radiation at the particular wavelength in a manner making it appear to be a mirror. Because the known laser generators employed in the combat environment includes a relatively limited number of wavelengths, it is possible to form a holographic optical element for each of these wavelengths. The laser protective eye wear becomes, in effect, a reflection filter having a relatively narrow filter band about the expected wavelength of the laser source. It is possible to construct a compound structure including holographic optical elements constructed to reflect differing wavelengths, in order to provide protection for a number of differing laser sources. Because the width of the notch in such holographic optical element reflectors is relatively narrow, normal visibility through such laser protective eye wear, even such eye wear having multiple holographic optical elements for protection against a number of wavelengths, it is relatively unimpaired.

Structures heretofore employed in such laser eye protection devices as goggles or visors do not solve the problems related to the provision of laser protection in a window. In particular, it is known in the art that such holographic optical elements do not provide protection for all angles of incident radiation. These reflection holographic optical elements provide a protection over only a cone of incident angles. Thus, the eye is not protected from laser illumination received at angles of incidence outside this cone. In the case of goggles or visors, it is possible to provide laser protection for greater angles of incidence employing construction geometries related to the expected position of the eye.

In accordance with U.S. Pat. No. 4,637,678, issued to Moss et al. on Jan. 20, 1987 entitled "Holographic Laser Protection Device," a compound holographic optical element structure is taught. A first holographic optical element covers angles of incidence about the normal to the surface of the visor, and a second holographic optical element covers angles of incidence oblique to the surface of the visor. In a second embodiment taught in that patent, the elements in a compound holographic optical element structure offer complementary coverage for angles of incidence from the right and from the left.

In accordance with U.S. Pat. No. 4,830,441 entitled "Holographic Filter Construction for Protective Eyewear," issued May 16, 1989, having the same assignee as the present invention, the geometry of the laser protection eye wear relative to the eye is exploited to provide greater angular coverage. This patent application teaches the use of geometries which are spherically symmetrical about the center of the eye rather than spherically symmetrical about the center of curvature of the protective element as previously taught.

The above teachings relative to goggles and visors cannot be applied to the case of a laser protection window. This is because the eye will not be at a fixed position relative to the laser protection window, contrary to the case of laser eye protection goggles or visors. Therefore, there is a need in the art to provide some manner of laser eye protection through a window such as a vehicle window.

SUMMARY OF THE INVENTION

The present invention is a laser protection window which includes a holographic optical element and a set of channel plates. The holographic optical element has interference fringes formed therein which forms a reflection hologram at the wavelength of the expected laser threat. It is understood that this reflection hologram will have a cone of protection and will not protect for illumination arriving at oblique angles. The set of channel plates are disposed at regular intervals at right angles to the holographic optical element. The height and spacing of these channel plates is such that illumination arriving at angles outside the cone of protection of the holographic optical element are blocked.

BRIEF DESCRIPTION OF THE DRAWINGS

These and other aspects of the present invention will become clearer from the following description taken in conjunction with the figures in which.

DETAILED DESCRIPTION OF THE PREFERRED EMBODIMENTS

Figure 1:
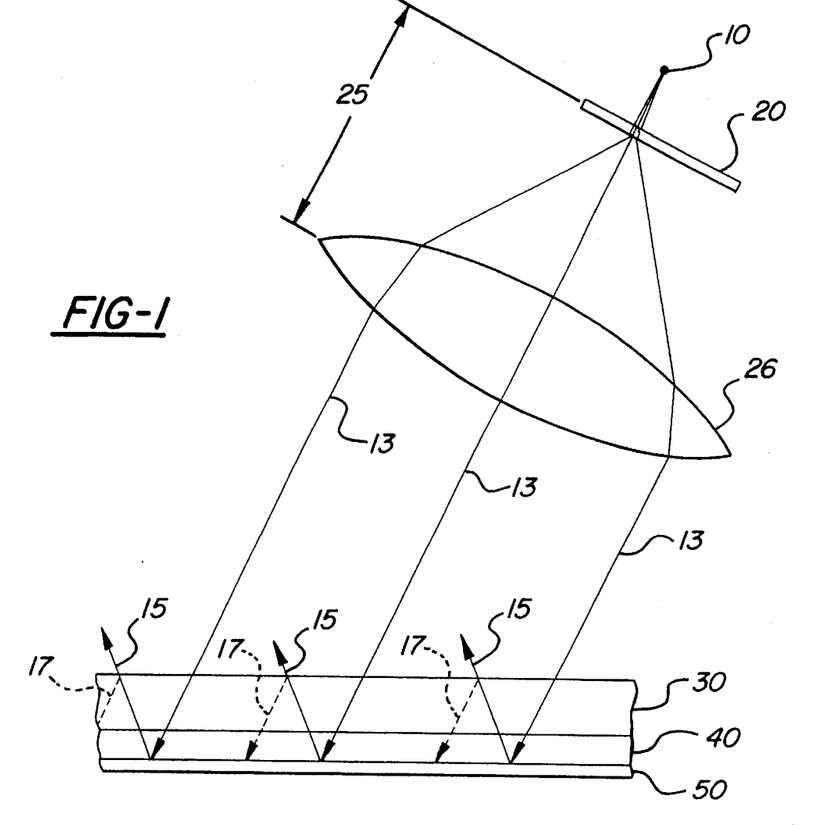
FIG. 1 illustrates schematically the construction of the holographic optical element in accordance with the present invention.

FIG. 1 illustrates schematically the manner of construction of the holographic optical element employed in the present invention. FIG. 1 illustrates laser point source 10, moving diffuser plate 20, collimating lens 26, transparent supporting substrate 30, photosensitive layer 40 and reflecting layer 50. Laser point source 10 generates light rays which emerge from moving diffuser plate 20 and collimating lens 26 as light rays 13. These light rays 13 are reflected from reflecting layer 50 as reflected rays 15 and further reflected from the interior surface of transparent supporting substrate 30 as further reflected rays 17.

The holographic optical element employed in the present invention is constructed as follows. Firstly, a layer of photosensitive material 40 is placed on one surface of a transparent supporting substrate 30. In accordance with the prior art, the photosensitive material preferably consist of a dichromated gelatin. The structure of transparent supporting substrate 30 is relatively unimportant except that it must be substantially transparent and have sufficient mechanical strength to support the photosensitive layer 40 during exposure. Transparent supporting surface substrate 30 may be constructed of transparent plastic or glass.

Next, reflecting layer 50 is disposed on the exposed surface of photosensitive layer 40. In accordance with the preferred embodiment of the present invention, reflecting layer 50 consists of a layer of silver which is vapor deposited upon the exposed surface of photosensitive layer 40. As an alternative to directly placing reflecting layer 50 on the exposed surface of photosensitive layer 40, it is feasible to provide a fixed reflecting surface coupled to the photosensitive layer 40 via a transparent index matching fluid. As a further alternative, no additional reflecting surface 50 is required. A transparent fluid having an index of refraction different from the index of refraction of photosensitive layer 40 is disposed beyond the exposed surface of photosensitive layer 40. The change in index of refraction at this boundary causes partial internal reflections within photosensitive layer 40. These reflections are of sufficient intensity to permit the formation of the desired interference fringes. In accordance with U.S. Pat. No. 4,582,389 issued to Wood et al on Apr. 15, 1986 entitled "Holographic Device" this transparent fluid could be the ambient air.

The photosensitive layer 40 is exposed as follows. Light having a relatively high coherence is generated by a laser and focused to form laser point source 10. This light is passed through a moving diffuser plate 20. Laser point source 10 generates light rays which form an extended light source emerging from moving diffuser plate 20. This extended light source on moving diffuser plate 20 is located a distance 25 from the collimating lens 26, at the focal point of collimating lens 26. Thus light rays 13 emerge from collimating lens 26 substantially parallel and making the same predetermined angle with transparent supporting substrate 30. The purpose of moving diffuser plate 20 is to reduce the coherence length of the exposure light. The reason for this reduction in the coherence length and the manner in which it is achieved will be further detailed below.

Light rays 13 emerging from the moving diffuser plate 20 and collimating lens 26 are employed to expose the photosensitive layer 40. These light rays 13 pass through transparent supporting substrate 30 and photosensitive layer 40 and are reflected from reflecting layer 50, becoming reflected rays 15. The direct rays 13 and the reflected rays 15 interfere in the regions where they overlap. In particular, an interference pattern is formed within photosensitive layer 40 due to the interference of direct rays 13 and reflected rays 15. This pattern of interference causes a change in the character of the photosensitive material forming photosensitive layer 40. Thus, the particular interference pattern is captured within photosensitive layer 40.

There will now follow an explanation of the reason for reducing the coherence length of the laser illumination via moving diffuser plate 20. Note in FIG. 1 the further reflected ray 17. This results from the reflection of reflected rays 15 from the inner surface of transparent supporting substrate 30. This reflection is due to the change in index of refraction from that of transparent supporting substrate 30 and what is typically ambient air beyond. The further reflected rays 17 interfere with direct rays 13 to form unwanted secondary interference patterns within photosensitive layer 40. Such secondary interference fringes can cause unwanted images and unwanted flare during the use of the laser protection window and should be avoided.

The reduction of the coherence length of the exposure light serves to control such secondary interference fringes. In accordance with the preferred embodiment of the present invention, the coherence length of the exposure light is reduced as taught in U.S. patent application Ser. No. 277,466 by Chang entitled "Method for Forming Holographic Optical Elements Free of Secondary Fringes," filed Nov. 11, 1988, a continuation of U.S. patent application Ser. No. 927,341, filed on Nov. 4, 1986, a continuation of U.S. patent application Ser. No. 613,901 filed May 24, 1984 and now abandoned. The coherence length of the exposure light is the greatest difference in path length between differing ray paths which still permits the formation of interference fringes. Typically, light generated by laser point source 10 has a coherence length which is many times greater than the thickness of transparent supporting substrate 30 and photosensitive layer 40 illustrated in FIG. 1. This coherence length is reduced by passing the diverging light from laser point source 10 through moving diffuser plate 20. Moving diffuser plate 20 preferably includes at least one ground glass surface. This ground glass surface causes the light from laser point source 10 to emerge from a number of sources thus providing reduced spatial coherence. The density of the ground glass surface can be adjusted to provide the desired reduction in coherence length.

This reduction in coherence length must be to a particular coherence length related to the exposure geometry. First, the coherence length of rays 13 must be greater than the longest distance that a ray would travel from first entry in photosensitive layer 40, passing through photosensitive layer 40, reflection by reflecting layer 50, passing back through photosensitive layer 40 to the boundary between photosensitive layer 40 and transparent supporting substrate 30. If the coherence length of rays 13 employed in the exposure is greater than the maximum such path length, then the optical system illustrated in FIG. 1 forms fringes of good contrast throughout the photosensitive layer 40. On the other hand, the reduced coherence length of light rays 13 must be less than the minimum distance a light ray would travel from first entry into photosensitive layer 40, passing through photosensitive layer 40, reflection by reflecting layer 50, passing through both photosensitive layer 40, transparent supporting substrate 30, reflection by the interior surface of transparent supporting substrate 30, and again entering into photosensitive layer 40. If the coherence length of exposure rays 13 is less than the minimum such distance, then no interference fringes are formed within photosensitive layer 40 by interference of the further reflected rays 17 with the illumination rays 13. By control of the coherence length of illumination rays 13, the recording of secondary interference fringes from such further reflected rays can be substantially eliminated.

After exposure, the photosensitive layer 40 is developed. In accordance with the prior art, the reflecting layer 50 is removed. In the case in which reflecting layer 50 is a vapor deposited silver layer, this removal can be through the use of an acid bath. Then the photosensitive layer 40 is developed in accordance with the prior art in order to fix the interference fringes recorded in this layer during exposure. If the photosensitive layer 40 is dichromated gelatin in accordance with the prior art, then the developed holographic optical element 45 (see FIG. 2) is sensitive to ambient humidity. In order to stabilize the structure and prevent deterioration of the interference contrast fringes stored therein, it is typical to dispose a transparent cover plate 60 on the exposed surface of the developed holographic optical element layer 45. This transparent supporting substrate 60 must be relatively impervious to moisture in order to protect holographic optical element layer 45. In addition, the transparent supporting substrate 30 must also be similarly impervious to moisture for the same reason.

Figure 2:
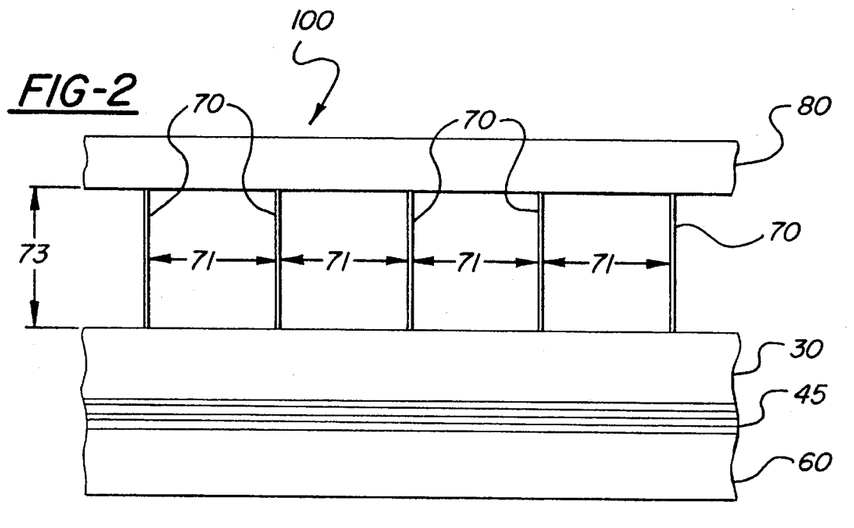
FIG. 2 illustrates in cross section the structure of the completed laser protection window in accordance with the present invention.

FIG. 2 illustrates the completed structure of the laser protection window in cross section. Illustrated in FIG. 2 is transparent supporting substrate 30, holographic optical element layer 45 and transparent cover plate 60. Also illustrated in FIG. 2 is a plurality of opaque channel plates 70. These opaque channel plates 70 are disposed perpendicular to the transparent supporting substrate 30 at regular intervals 71. FIG. 2 illustrates that each opaque channel plate 70 has a height 73. This height 73 is selected in relationship to the regular interval 71 in a manner which will be more further detailed below. FIG. 2 lastly illustrates a transparent cover plate 80. This transparent cover plate 80 is disposed over the open ends of the opaque channel plates 70. The purpose of transparent cover plate 80 is to prevent dust and debris from gathering within the space between opaque channel plates 70.

Figure 3:
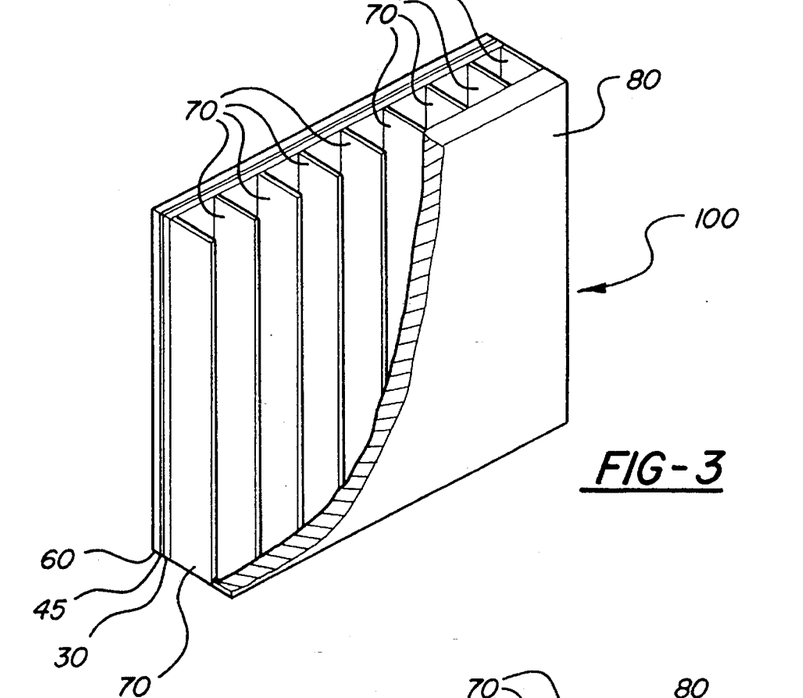
FIG. 3 illustrates a partial cut-away perspective view of one embodiment of the channel plates of the present invention.
Figure 4:
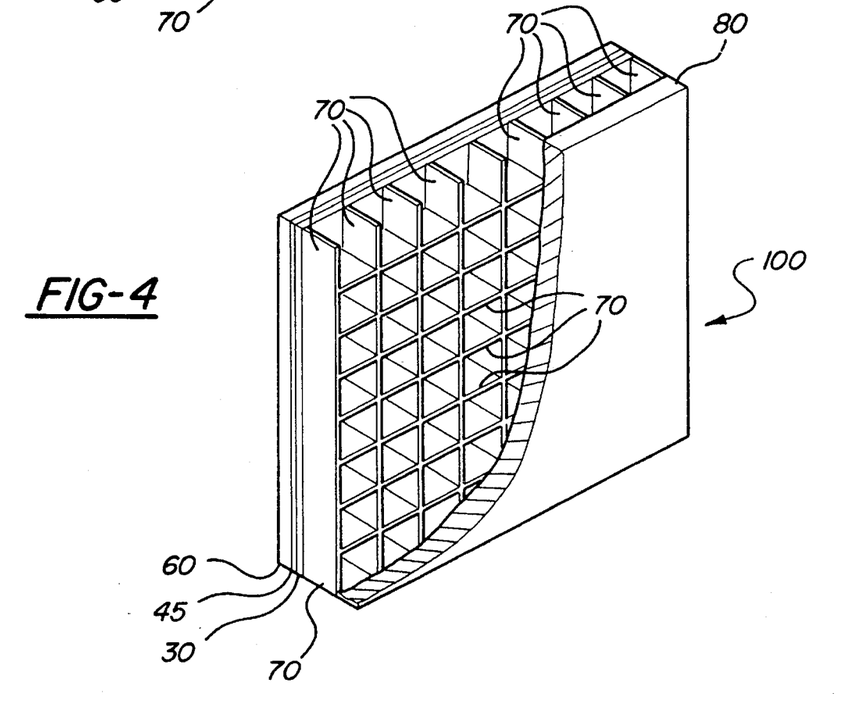
FIG. 4 illustrates in partial cut-away perspective view a second embodiment of the channel plates in accordance with the present invention.
Figure 5:
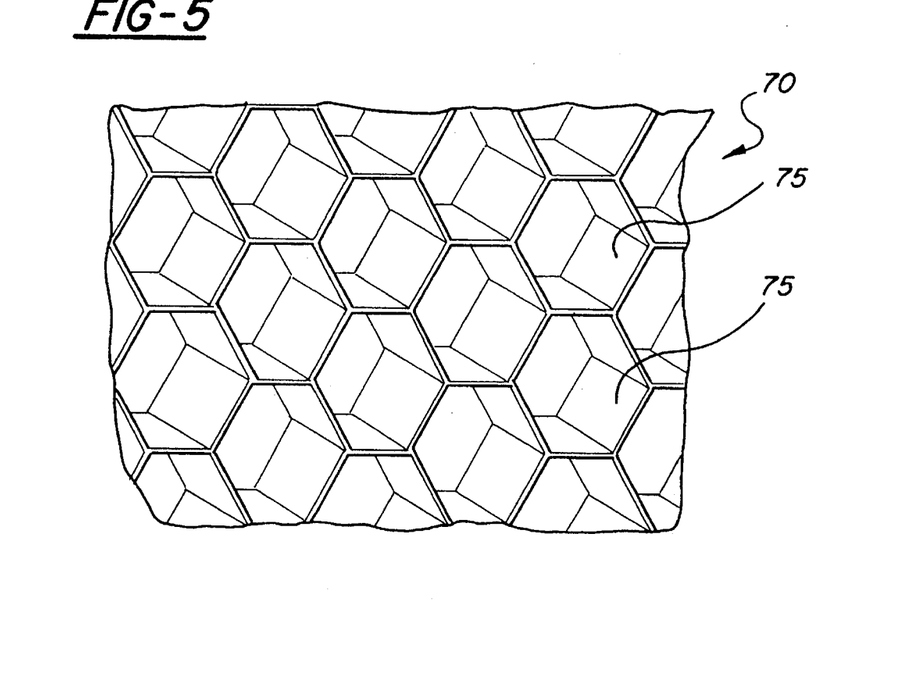
FIG. 5 illustrates in perspective view a further embodiment of the channel plates in accordance with the present invention.

FIGS. 3, 4 and 5 illustrate three alternative embodiments for the construction of opaque channel plates 70. FIGS. 3 and 4 are partial cut-away perspective views of the entire structure of the laser protection window 100 showing alternative dispositions of opaque channel plates 70. FIG. 5 illustrates a perspective view of an alternative set of opaque channel plates 70.

FIG. 3 illustrates a first alternative for the deposition of opaque channel plates 70. As illustrated in FIG. 3, opaque channel plates 70 are disposed as vertical plates throughout the width of the laser protection window 100. As noted above, the holographic optical element layer 45 provides protection for laser illumination at a particular wavelength over a cone of incident angles. Opaque channel plates 70 are disposed in the laser protection window 100 in order to block light incident outside this cone of protection. In the case of the embodiment illustrated in FIG. 3, it is believed that the laser threat may lie within any horizontal incident angles but is limited in range of vertical incident angles. This type of construction could be employed when it is expected that all of the laser illumination sources are ground based. Even in the event that some of the laser illumination sources may be based upon aircraft, it is typically the case that the laser illumination occurs at relatively long ranges and therefore the cone of protection of holographic optical element layer 45 would include most of these angles of incidence in the vertical plane. Thus, it is believed that it would not be a great risk to provide no protection for laser illumination from vertical angles outside the cone of protection because it is not believed that laser illumination sources would be often in locations to illuminate the laser protection window from such angles.

FIG. 4 illustrates in partial cut-away fashion and perspective view of a second embodiment of opaque channel plates 70. As in the case illustrated in FIG. 3, opaque channel plates 70 in FIG. 4 include vertically disposed opaque channel plates. In addition, FIG. 4 further illustrates the inclusion of horizontally disposed opaque channel plates. These horizontally disposed opaque channel plates are disposed at the same regular intervals and are employed to block laser illumination at angles of incidence outside the cone of protection of holographic optical element layer 45 within the vertical plane. The horizontally disposed opaque channel plates 70 illustrated in FIG. 4 provide the same protection in the vertical plane as the vertically disposed opaque channel plates 70 illustrated also in FIG. 3.

FIG. 5 illustrates a further embodiment of the structure of opaque channel plates 70. FIG. 5 illustrates opaque channel plates 70 in the form of a set of hexagonal polygons, regularly disposed to fill the entire area of the holographic optical element layer 45. This forms a honeycomb-type structure which can be employed to provide protection from laser illumination incident from all angles outside the cone of protection of the holographic optical element layer 45. It should be noted that the provision of hexagons 75 is similar to the construction illustrated in FIG. 4 in that the entire plane is covered with regular cells of opaque channel plates 70 having polygonal cross sections. In the case of FIG. 5, these polygons are hexagons, in the case of FIG. 4, these polygons are squares. However, the same principles apply regardless of the particular type of polygon employed. The essential point is that the entire plane is covered with such polygons. The opaque channel plates 70 thus provide protection from laser illumination at angles of incidence outside the cone of protection of holographic optical elements 45.

Figure 6:
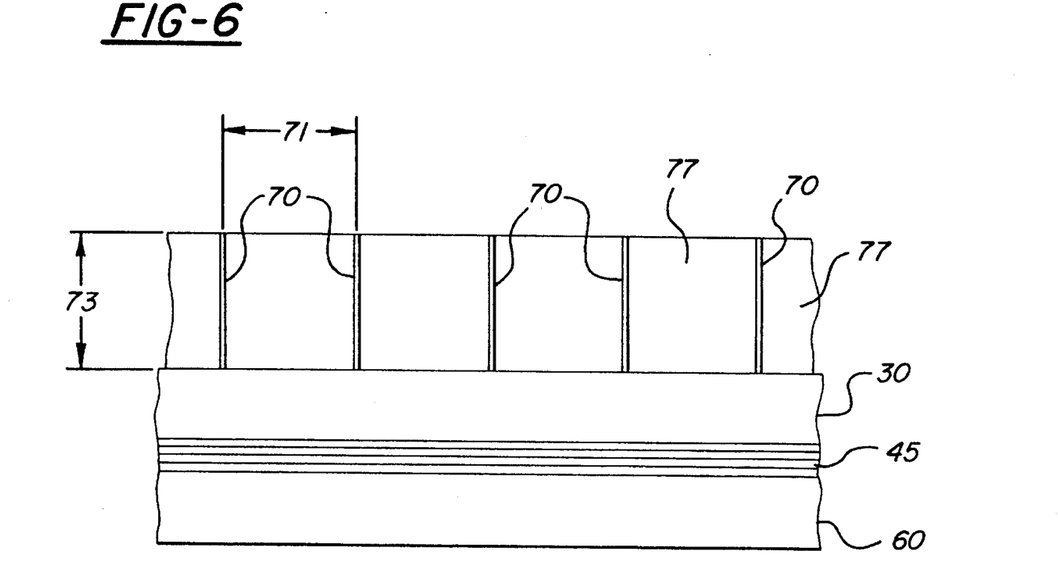
FIG. 6 illustrates in cross section the structure of the completed laser protection window in accordance with an alternative embodiment of the present invention.

Throughout this prior discussion it was implied that the space between the opaque channel plates 70 was filled with air. This need not be the case. In particular these spaces could be filled with any transparent substance. As illustrated in FIG. 6, the opaque channel plates 70 could be embedded in a transparent material 77. In such a construction the transparent cover plate 80 illustrated in FIG. 2 could be eliminated.

Figure 7:
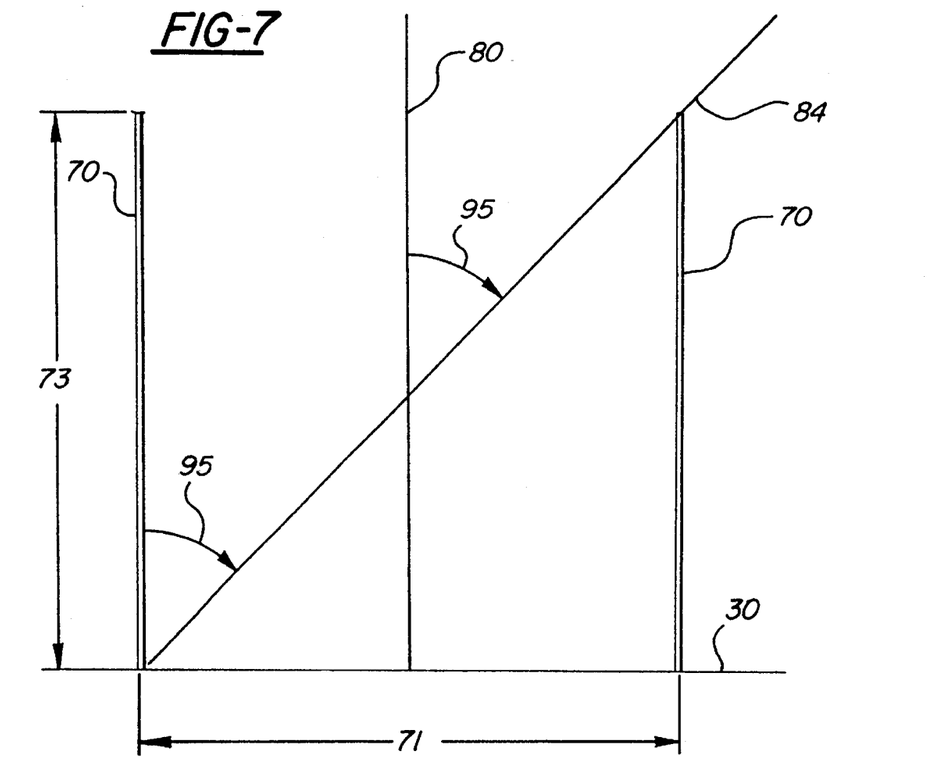
FIG. 7 illustrates the geometry employed for calculation of the relative height to spacing of the channel plates in accordance with the present invention.

FIG. 7 illustrates the technique for determining the ratio of the height 70 versus the regular interval 71 between adjacent channel plates 70. The most oblique ray which can pass between channel plates 70 is ray 84. This ray 84 just touches the top of one channel plate 70 and enters the transparent supporting substrate 30 at the bottom of the adjacent channel plate 70. This ray 84 makes an angle 95 with the vertical 80. In order to protect against this ray, the height 73 of the channel plate must be at least:

$$H = \frac{W}{\tan A}$$

Where H is the height 73 of the channel plate 70, W is the regular interval 71 between adjacent channel plates 70 and A is the angle 95, equal to the angle of the cone of protection of the holographic optical element layer 45 as measured in the material between the channel plates 70. Note that if the alternative embodiment illustrated in FIG. 6 is employed, then the material between the channel plates 70 would be other than air and thus would have an index of refraction differing from 1. the angle of incidence to the laser protection window 100 would differ from the angle A in the equation due to refraction at the surface of transparent material 77. In the case in which the angle of the cone of protection is 30 degrees, then the tangent is 0.5. Thus the height H must be at least equal to the twice the width W. In the event that the conical angle of protection is 45 degrees, then the tangent equals one. In such an event, the height H must be at least the width W for for complete protection.

Figure 8:
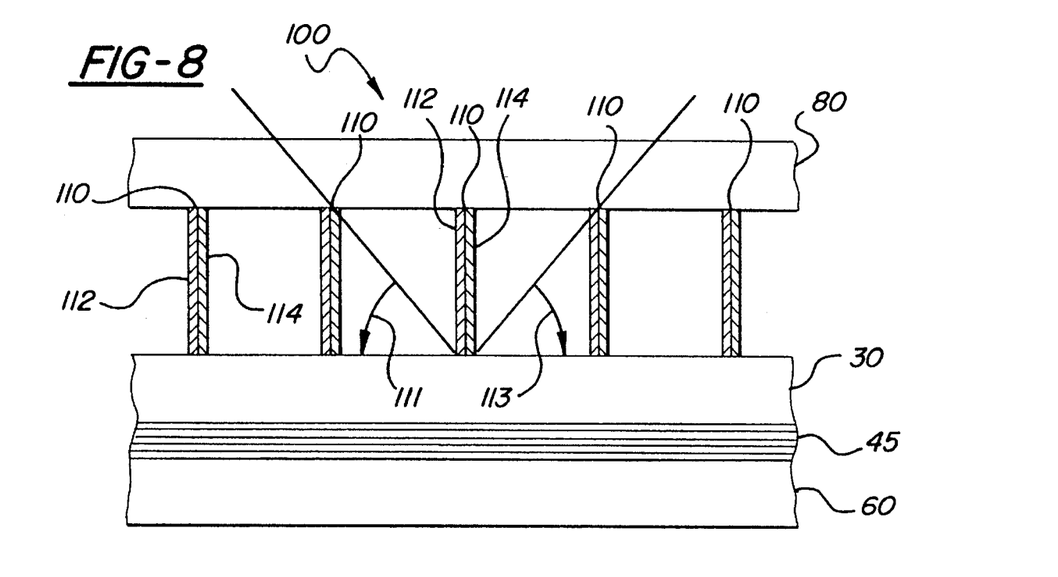
FIG. 8 illustrates in cross section the structure of the completed laser protection window in accordance with an alternative embodiment of the present invention employing holographic optical element channel plates.

FIG. 8 illustrates a further embodiment of the present invention. FIG. 8 is very similar to FIG. 2 except that the opaque channel plates 70 illustrated in FIG. 2 are replaced with compound holographic optical element channel plates 110 in FIG. 8. It is not necessary that the channel plates be opaque to all light. The channel plates need only be opaque to light on the expected laser threat wavelength. Therefore opaque channel plates 70 can be replaced with compound holographic optical element channel plates 110.

Compound holographic optical element channel plates 110 each consists of a first holographic optical element 112 and a second holographic optical element 114. Each of these holographic optical elements are reflection holograms. These reflection holograms are formed in a manner known in the art. This method must differ slightly from the method of construction of holographic optical element layer 45. First and second holographic optical elements 112 and 114 require interference fringes that are tilted with respect to their respective surfaces. The technique for forming holographic optical element layer 45 insures that the interference fringes are parallel to the surface. First holographic optical element 112 is constructed to substantially reflect light arriving at the laser protection window 100 at angles within cone 111. Similarly, second holographic optical element 112 is constructed to substantially reflect light arriving at the laser protection window 100 at angles within cone 113. These two holographic optical elements can be constructed identically and one holographic optical element turned to provide coverage for the supplemental angles.

Together compound holographic optical element channel plate 110 is substantially opaque to light at the laser threat wavelength that arrives at angles outside the cone of protection of holographic optical element layer 45. Thus the structure illustrated in FIG. 8 provides substantially the same protection as that illustrated in FIG. 2. The structure illustrated in FIG. 8 is advantageous over that of FIG. 2 because it passes light of wavelengths other than the laser threat wavelength arriving at oblique angles outside the cone of protection of holographic optical element layer 45. This improves the visibility though laser protection window 100.

We claim:

1. A laser protection window for protection of an eye having no fixed position relative to the laser protection window from an expected laser threat comprising:

a planar holographic optical element having interference fringes embedded therein for forming a reflection hologram at the wavelength of the expected laser threat; and a set of channel plates disposed at regular intervals at right angles to said holographic optical element, each of said channel plates opaque to light at said wavelength of the expected laser threat;

whereby said set of channel plates cooperate to block all incoming light arriving at angles for which said holographic optical element does not reflect said wavelength of the expected laser threat from reaching the eye regardless of the position of the eye behind said laser protection window and further cooperate to permit substantially all incoming light passed by said holographic optical element arriving at angles for which said holographic optical element reflects said wavelength of the expected laser threat to reach the eye regardless of the position of the eye behind said laser protection window.

2. The laser protection window as claimed in claim 1, wherein said channel plates are opaque to all light.

3. The laser protection window as claimed in claim 1, wherein:

said holographic optical element includes a conical blocking angle with regard to laser illumination at said wavelength of the expected laser threat; and said channel plates have a height vertical to said holographic optical element not less than said regular interval between said channel plates divided by the tangent of said conical blocking angle.

4. The laser protection window as claimed in claim 1, wherein:

said set of channel plates consists of a set of vertically disposed channel plates.

5. The laser protection window as claimed in claim 1, wherein:

said set of channel plates consists of a first set of vertically disposed channel plates and a second set of intersecting horizontally disposed channel plates.

6. The laser protection window as claimed in claim 1, wherein:

said set of channel plates consists of a set of regularly occurring cells having a polygonal cross section disposed to cover said holographic optical element.

7. The laser protection window as claimed in claim 6, wherein:

said polygonal cross section of said set of channel plates is hexagonal.

8. The laser protection window as claimed in claim 1, wherein:

each of said channel plates consists of holographic optical elements having interference fringes embedded therein for forming a reflection hologram at said wavelength of the expected laser threat.

9. The laser protection window as claimed in claim 8, wherein:

said holographic optical element includes a conical blocking angle for substantially reflecting only laser illumination at said wavelength of the expected laser threat having angles of incidence within said conical blocking angle; and each of said channel plates consists of a compound holographic optical element channel plate including a first reflection holographic optical element having interference fringes embedded therein for reflecting light received from a first side of said channel plate at an oblique angle to said holographic optical element outside said conical blocking angle as measured within the medium between said channel plates and a second reflection holographic optical element having interference fringes embedded therein for reflecting light received from a second side of said channel plate opposite to said first side at an oblique angle to said holographic optical element outside said conical blocking angle as measured within the medium between said channel plates.

10. A method for construction of a laser protection window for protection of an eye having no fixed position relative to the laser protection window from an expected laser threat, the method comprising the steps of:

disposing a layer of photosensitive material on a one surface of a planar transparent supporting substrate thereby forming a photosensitive layer having an exposed surface;

disposing a reflecting surface on the exposed surface of said photosensitive layer;

exposing said photosensitive layer to coherent light illumination via said transparent supporting substrate thereby forming interference fringes from light directly incident upon said photosensitive layer and light reflected from said reflecting surface;

removing said reflecting surface from said photosensitive layer;

developing said photosensitive layer thereby forming a reflection holographic optical element having interference fringes corresponding to the interference fringes of the exposure; and disposing a set of channel plates opaque to light at the wavelength of the expected laser threat at regular intervals at right angles to said holographic optical element;

whereby said set of channel plates cooperate to block all incoming light arriving at angles for which said holographic optical element does not reflect said wavelength of the expected laser threat from reaching the eye regardless of the position of the eye behind said laser protection window and further cooperate to permit substantially all incoming light passed by said holographic optical element arriving at angles for which said holographic optical element reflects said wavelength of the expected laser threat to reach the eye regardless of the position of the eye behind said laser protection window.

11. A method for construction of a laser protection window as claimed in claim 10, wherein said channel plates are opaque to all light.

12. A method for construction of a laser protection window as claimed in claim 10, wherein:

said holographic optical element includes a conical blocking angle with regard to laser illumination at said expected threat wavelength; and said channel plates have a height vertical to said holographic optical element not less than said regular interval between said channel plates divided by the tangent of said conical blocking angle.

13. A method for construction of a laser protection window as claimed in claim 10, wherein:

said set of channel plates consists of a set of vertically disposed channel plates.

14. A method for construction of a laser protection window as claimed in claim 10, wherein:

said set of channel plates consists of a first set of vertically disposed channel plates and a second set of intersecting horizontally disposed channel plates.

15. A method for construction of a laser protection window as claimed in claim 10, wherein:

said set of channel plates consists of a set of regularly occurring cells having a polygonal cross section disposed to cover said holographic optical element.

16. A method for construction of a laser protection window as claimed in claim 15, wherein:

said polygonal cross section of said set of channel plates is hexagonal.

17. A method for construction of a laser protection window as claimed in claim 10, wherein:

said holographic optical element includes a conical blocking angle for substantially reflecting only laser illumination at said wavelength of the expected laser threat having angles of incidence within said conical blocking angle; and said step of disposing a set of channel plates at regular intervals at right angles to said holographic optical element includes forming a plurality of reflection holographic optical elements having interference fringes embedded therein for reflecting light of said wavelength of the expected laser threat incident at angles more oblique than said conical blocking angle as measured within the medium between said channel plates, and forming compound holographic optical element channel plates including a first reflection holographic optical element disposed for reflecting light received from a first side and a second reflection holographic optical element disposed for reflecting light received from a second side opposite to said first side, and disposing said compound holographic optical element channel plates at regular intervals at right angles to said holographic optical element.

18. A method for construction of a laser protection window as claimed in claim 10, wherein:

said step of exposing said photosensitive layer to coherent light illumination includes generating a first beam of light having a high degree of coherence, reducing the coherence of said first beam of light thereby producing a second beam of light having a limited coherence length, illuminating said photosensitive layer via said transparent supporting substrate, reflecting said second beam from said reflecting surface, said limited coherence length being greater than the path length of said third beam of light from said reflecting surface to said transparent supporting substrate and less than the path length of said third beam of light from said reflecting surface to the surface of said transparent supporting substrate opposite said photosensitive layer and reflected back to said photosensitive layer, thereby preventing the formation of interference fringes from such reflections.

19. A method for construction of a laser protection window for protection of an eye having no fixed position relative to the laser protection window from an expected laser threat, the method comprising the steps of:

disposing a layer of photosensitive material on a one surface of a planar transparent supporting substrate thereby forming a photosensitive layer having an exposed surface;

disposing a transparent fluid having an index of refraction different from the index of refraction of said photosensitive layer beyond the exposed surface of said photosensitive layer;

exposing said photosensitive layer to coherent light illumination via said transparent supporting substrate thereby forming interference fringes from light directly incident upon said photosensitive layer and light reflected from said exposed surface of said photosensitive layer due to the difference in index of refraction between said photosensitive layer and said transparent fluid;

developing said photosensitive layer thereby forming a reflection holographic optical element having interference fringes corresponding to the interference fringes of the exposure; and disposing a set of channel plates opaque to light at the wavelength of the expected laser threat at regular intervals at right angles to said holographic optical element;

whereby said set of channel plates cooperate to block all incoming light arriving at angles for which said holographic optical element does not reflect said wavelength of the expected laser threat from reaching the eye regardless of the position of the eye behind said laser protection window and further cooperate to permit substantially all incoming light passed by said holographic optical element arriving at angles for which said holographic optical element reflects said wavelength of the expected laser threat to reach the eye regardless of the position of the eye behind said laser protection window.

20. A method for construction of a laser protection window as claimed in claim 19, wherein:

said holographic optical element includes a conical blocking angle with regard to laser illumination at said expected threat wavelength; and said channel plates have a height vertical to said holographic optical element not less than said regular interval between said channel plates divided by the tangent of said conical blocking angle.

21. A method for construction of a laser protection window as claimed in claim 19, wherein:

said set of channel plates consists of a set of vertically disposed channel plates.

22. A method for construction of a laser protection window as claimed in claim 19, wherein:

said holographic optical element includes a conical blocking angle for substantially reflecting only laser illumination at said wavelength of the expected laser threat having angles of incidence within said conical blocking angle; and said step of disposing a set of channel plates at regular intervals at right angles to said holographic optical element includes forming a plurality of reflection holographic optical elements having interference fringes embedded therein for forming a reflection hologram for reflecting light of said wavelength of the expected laser threat incident at angles more oblique than said conical blocking angle as measured within the medium between said channel plates, and forming compound holographic optical element channel plates including a first reflection holographic optical element disposed for reflecting light received from a first side and a second reflection holographic optical element disposed for reflecting light received from a second side opposite to said first side, and disposing said compound holographic optical element channel plates at regular intervals at right angles to said holographic optical element.

23. A method for construction of a laser protection window as claimed in claim 19, wherein:

said step of exposing said photosensitive layer to coherent light illumination includes generating a first beam of light having a high degree of coherence, reducing the coherence of said first beam of light thereby producing a second beam of light having a limited coherence length, illuminating said photosensitive layer via said transparent supporting substrate, reflecting said second beam from said reflecting surface, said limited coherence length being greater than the path length of said third beam of light from said reflecting surface to said transparent supporting substrate and less than the path length of said third beam of light from said reflecting surface to the surface of said transparent supporting substrate opposite said photosensitive layer and reflected back to said photosensitive layer, thereby preventing the formation of interference fringes from such reflections.

24. A method for construction of a laser protection window as claimed in claim 19, wherein said transparent fluid consists of ambient air.

25. The laser protection window as claimed in claim 1, further comprising:

a transparent cover plate disposed covering said set of channel plates opposite to said reflection holographic optical element.

26. The laser protection window as claimed in claim 1, further comprising:

a transparent filler material disposed filling the space between said set of channel plates.

27. A method for construction of a laser protection window as claimed in claim 10, further comprising the step of:

covering said set of channel plates opposite to said reflection holographic optical element with a transparent cover plate.

28. A method for construction of a laser protection window as claimed in claim 10, further comprising the step of:

filling the space between said set of channel plates with a transparent filler material.

29. A method for construction of a laser protection window as claimed in claim 19, further comprising the step of:

covering said set of channel plates opposite to said reflection holographic optical element with a transparent cover plate.

30. A method for construction of a laser protection window as claimed in claim 19, further comprising the step of:

filling the space between said set of channel plates with a transparent filler material.

* * * * *